United States Patent Office 3,070,988
Patented Jan. 1, 1963

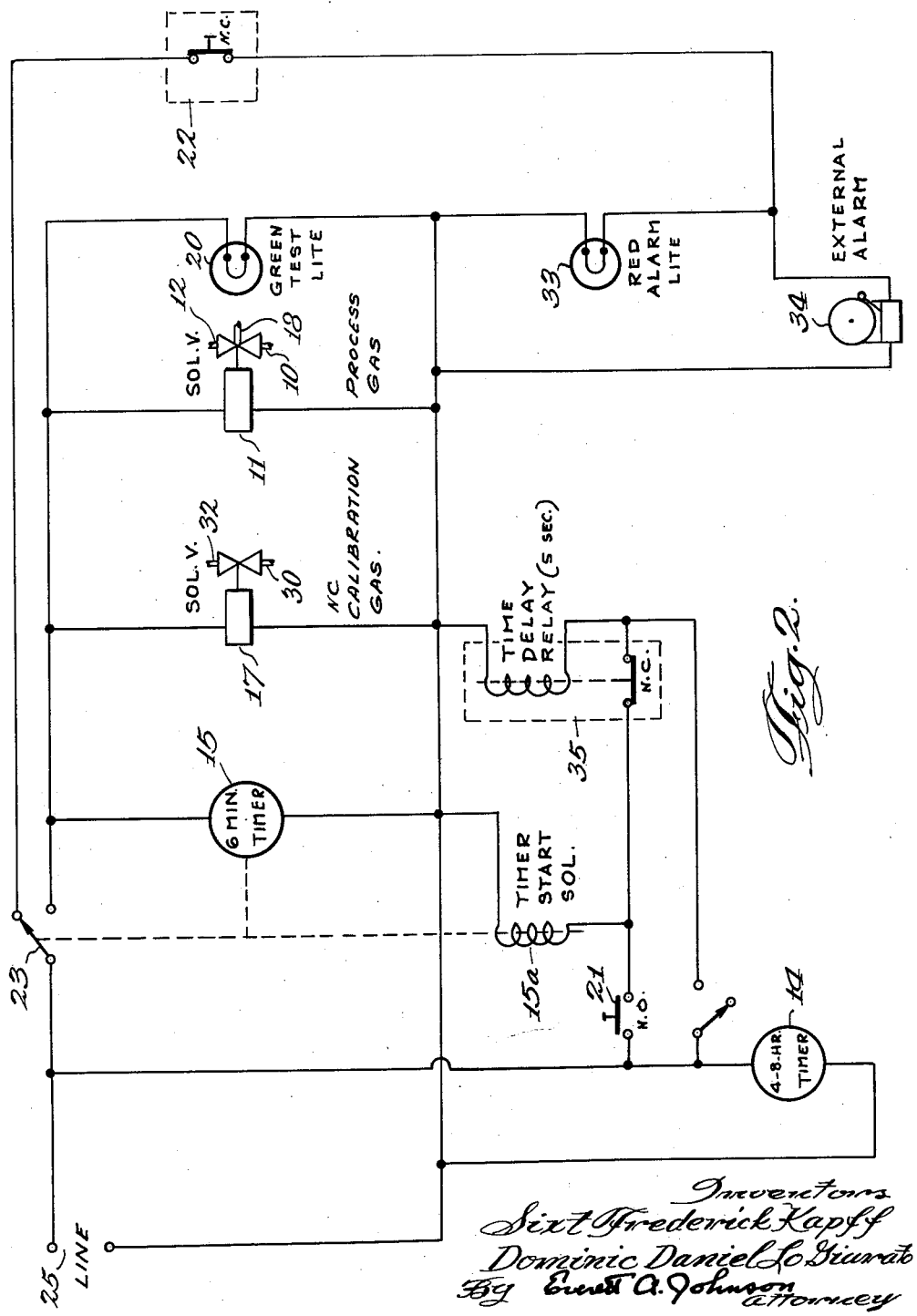

3,070,988
OXYGEN ANALYZER-STANDARDIZER
Sixt Frederick Kapff, Homewood, and Dominic Daniel Lo Giurato, Oak Lawn, Ill., assignors to Standard Oil Company, Chicago, Ill., a corporation of Indiana
Filed Oct. 15, 1957, Ser. No. 690,398
3 Claims. (Cl. 73—1)

This invention relates to continuous oxygen analyzers on process streams. More particularly the invention relates to apparatus whereby the readings of such analyzers can be checked at any time.

Continuous oxygen analyzers are widely used in refinery operations to insure that process gas streams are safely below the explosive region by being deficient in oxygen. On the other hand, there is frequently considerable incentive to have as high an oxygen concentration in a given stream as safety will permit. In both cases, safe and efficient operation is dependent upon obtaining accurate readings of oxygen concentrations.

Frequent checking of the oxygen instrument is therefore desirable to insure that it is reading correctly. In the past, this has been primarily done by Orsat analyses or by laborious manual connection to standard gas cylinders. Such analyses are time consuming and subject to inaccuracies arising from manipulative errors. Further, the system is not automatic and the information on the condition and reliability of the instrument cannot be obtained rapidly.

It is therefore a primary object of this invention to provide an apparatus adapted to insure that an oxygen analyzer is reading correctly. Another object of the invention is to provide an apparatus which is automatic, accurate, and rapid in operation. A further object of the invention is to provide an apparatus which monitors the flow of the stream being analyzed by the instrument to be checked. It is also an object of the invention to provide a system for automatically checking on the calibration of an oxygen analyzer at specified intervals and manually at any time. These and other objects of the invention will become apparent as the description thereof is given.

According to our invention, the operation of an oxygen analyzer is automatically checked by introducing into the instrument periodically, or at the option of the operator, a sample of a calibration gas of known composition. The automatic checking is by means of a continuously cycling timer which actuates suitable solenoid valves, and the manual checking is by means of a push button switch. The instrument has the additional feature of sensing a flow failure of the process sample and actuating an appropriate alarm.

Further details and advantages of the invention will be described by reference to the accompanying drawings wherein:

FIGURE 2 is an electrical circuit diagram.

Figure 1:
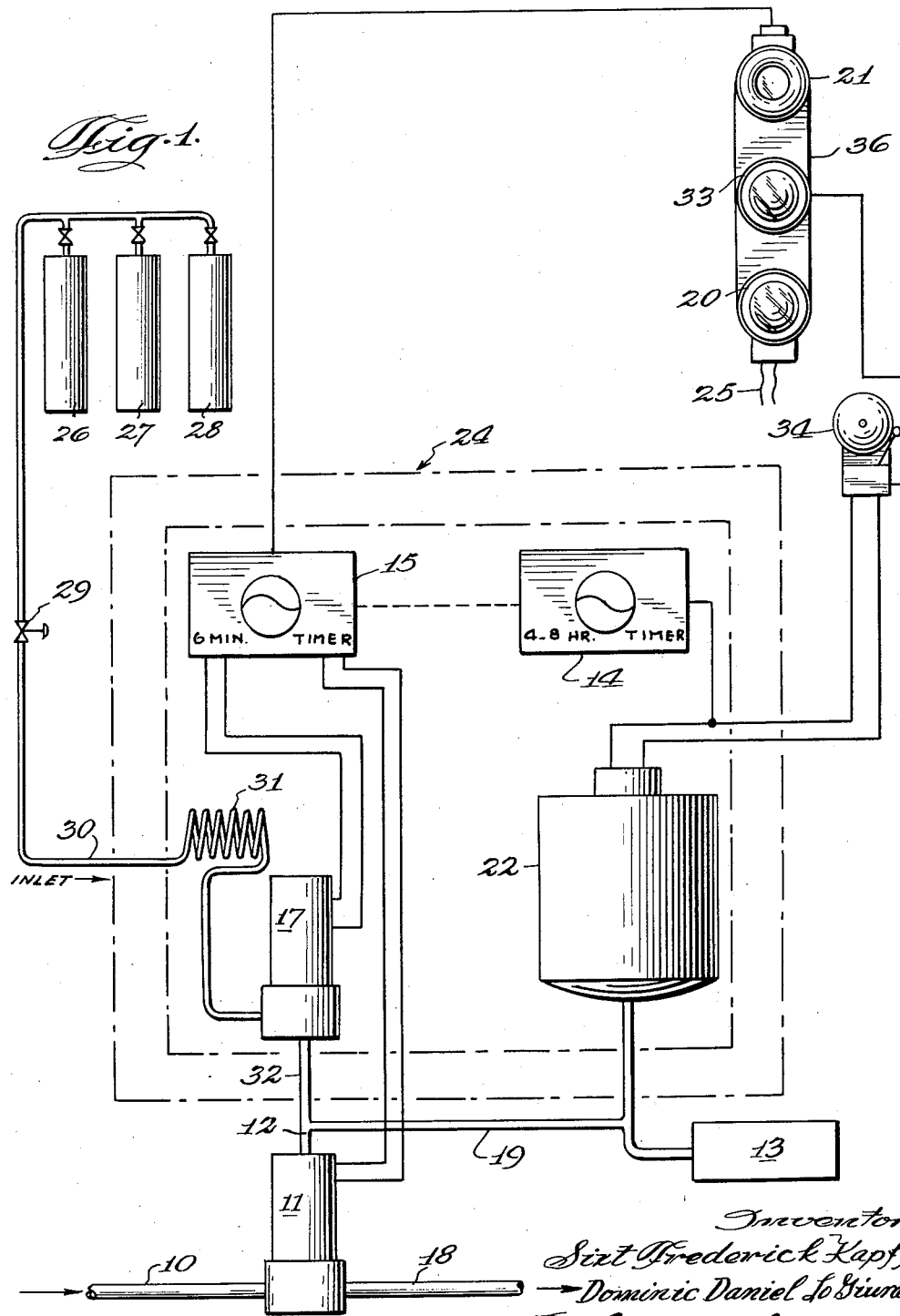
FIGURE 1 is a schematic diagram of one form of the apparatus.

Referring to the drawings, process gas in line 10 is normally flowing through valve 11 to outlet 12 through line 19 and to the oxygen instrument 13. Every 6 hours, 4–8 hour timer 14 supplies power to the 6-minute timer 15 which operates solenoid valve 11 to divert the process gas in line 10 to a vent 18 and valve 17 to supply standardizing gas from line 30 and capillary 31 via lines 32 and 19 to the oxygen instrument 13. This standardizing gas flows in line 19 for a time sufficient to completely remove process gas from the instrument 13. While the standardization cycle is operating, a green light 20 indicates this to the operator. After 6 minutes, timer 15 stops and returns process gas via valve 11 and line 19 to the instrument 13.

Inviting attention to FIGURE 2, an electrical circuit constituting the preferred embodiment of the inventive apparatus is shown. Broadly, this circuit contains 6-minute timer 15 which operates over a controlled period of time to divert process gas from line 12 leading to the analyzer into vent line 18 and substituting the standardizing gas via valved line 30—32. The 6-minute timer 15 is controlled by 4–8 hour timer 14 via time delay relay 35 to authorize one standardization every 6 hours.

As depicted in FIGURE 2, the circuit is shown arranged for process gas flow. The 4–8 hour timer 14 is connected across line leads 25, and no power is being supplied to 6-minute timer 15 or to solenoid valves 11 and 17. When, however, 4–8 hour timer 14 moves the nearby switch to closed-circuit position, or when push-button switch 21 is closed, current is applied through time delay relay 35 to energize timer start solenoid 15a.

Timer start solenoid 15a is mechanically coupled to 6-minute timer 15 and to alarm cutout 23. When timer start solenoid 15a is energized, it changes the position of alarm cutout 23 so as to deny power to alarm light 33 and bell alarm 34, and to supply power to parallel-connected 6-minute timer 15 and solenoid valves 11 and 17. This new configuration is maintained for one cycle of 6-minute timer 15 (during which calibration than process gas is sent to oxygen instrument 13), after which timer 15 releases cutout 23 and restores the initial configuration.

If the operator should desire additional standardizations, a manually operated test switch 21 permits him to initiate check at any time. Warning of a failure of the flow of process gas in line 19 to the instrument 13 is provided by a pressure switch 22 set to alarm and actuate alarm light 33 and bell alarm 34 if the pressure in line 19 decreases below a predetermined point. A cutout 23 prevents operation of this alarm when standardizing.

The explosion-proof housing 24, typically about 8" x 8" x 8" and containing all the wiring, timers 14 and 15, pressure switch 22, and valve 17, is mounted adjacent the oxygen analyzer instrument 13.

Connection to the 110-volt supply by leads 25 initiates the 6-hour timer 14. Process gas in line 10 comprising 0.25 inch copper or stainless steel tubing is connected to solenoid valve 11. Standardizing gas from one of cylinders 26, 27 or 28 is delivered by regulator valve 29 and inlet line 30 on housing 24. The standardizing gas passes immediately into flow-control capillary 31 discharging into solenoid valve 17 which is actuated by 6-minute timer 15. The instrument on a 4–8 hour calibration cycle controlled by timer 14 consumes calibrating gas from the cylinders 26, 27 and 28 at a rate of about 3 s.c.f./week.

The pressure of the standardizing gas is controlled by pressure-controller valve 29 at about 7 p.s.i.g. This gives sufficient flow through the oxygen instrument 13 to obtain a standard reading in 6 minutes without wastage of gas.

If the process gas is supplied in line 10 at a pressure of about 4 to 6 inches of water at the inlet to valve 11, the pressure switch 22 will operate alarm pilot light 33 whenever the pressure in line 19 drops below this value thereby indicating insufficient flow to the oxygen analyzer 13.

The push button switch 21 overrides the 4–8 hour timer 14. It is incorporated in an explosion-proof housing 36 that is mounted in the control room where the indicator for the instrument is located.

The time delay relay 35 is normally closed, and upon actuation remains closed for 5 seconds after which it interrupts the current and limits the 6-minute timer 15 to a single cycle every 6 hours when the calibration check is made automatically as described. This is necessary because the contact action of the 4–8 hour timer 14 is so slow that the start solenoid 15a on the 6-minute timer 15 would otherwise be held in long enough to cause the 6-minute timer 15 to repeat several times. This is not a problem with the manually initiated check because of the momentary contact construction of switch 21.

At the end of 6 minutes, the circuit is broken, the solenoid valves 11 and 17 are returned to their original positions, the alarm circuit is re-established, and the green test light 20 is extinguished. If the power to the calibration checker fails, this does not interfere with the operation of the analyzer 13.

Our system may be used in many operations where oxygen concentration is to be controlled accurately at a predetermined level. Oxygen analyzing devices for process control must be maintained accurate as to range and zero. For example, in operations where oxygen concentrations of about 3% are most critical, instrument zero on analyzer 13 is set by using standard cylinder gas from cylinder 27 containing 4.0% oxygen. For optimum accuracy in the range of 0 to 1% oxygen, as in monitoring inert gas generation, a third cylinder 28 containing a standard gas of about 0.5% oxygen concentration is used.

The use of this invention is not limited to oxygen analyzers but may be applied to any automatic gas analyzer attached to a process line. For example, if an air stream is being monitored for combustibles, then the present invention could be used to check the operation of the combustibles recorder by periodically introducing standardizing gas containing a small percentage of combustibles.

Although the invention has been described with reference to embodiments thereof, it should be understood that these are by way of illustration only and that the invention is not necessarily limited to such embodiments. Alternative components and operating techniques will become apparent to those skilled in the art in view of the foregoing disclosure and, accordingly, modifications in the construction and operation of the apparatus are contemplated without departing from the spirit of our invention.

What we claim is:

1. In an apparatus for continuously monitoring a process gas sample, including an analyzer, a first valved conduit means for delivering a process gas sample to said analyzer, a source of calibration gas of known composition, a second valved conduit means for delivering a calibration gas sample to said analyzer, the improvement whereby said analyzer may be standardized both automatically and manually while in service comprising: a short period cycle timer controlling both of said valved conduit means to interrupt process gas sample flow through said first valved conduit means and to permit calibration gas flow through said second valved conduit means for a controlled period of time to effect standardization of said analyzer and thereafter return the respective flows to their original condition, a long period cycle timer controlling said short period cycle timer and thereby determining the cycle over which said short period cycle timer operates, and manual switch means independently controlling said short period cycle timer to effect manual standardization.

2. Apparatus of claim 1 including a third valved conduit means also controlled by said short period cycle timer for venting the process gas sample during standardization.

3. Apparatus of claim 1 including pressure-responsive means on said first valved conduit means operative only when the process gas sample is delivered to the analyzer, said pressure-responsive means actuating an alarm means when the pressure in said first valved conduit means drops below a predetermined value.

References Cited in the file of this patent

UNITED STATES PATENTS

| | | |
|---|---|---|
| 1,933,322 | Fagan | Oct. 31, 1933 |
| 2,211,627 | Morgan et al. | Aug. 13, 1940 |
| 2,618,150 | Willenborg | Nov. 18, 1952 |
| 2,637,019 | De Piccolellis et al. | Apr. 28, 1953 |
| 2,663,379 | Doan | Dec. 22, 1953 |
| 2,721,578 | Pouppirt | Oct. 25, 1955 |